(No Model.)
W. S. F. DILLON.
NUT LOCK.
No. 257,854. Patented May 16, 1882.
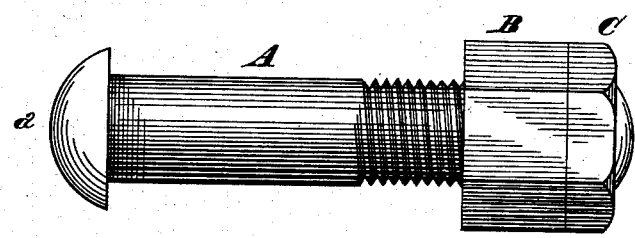
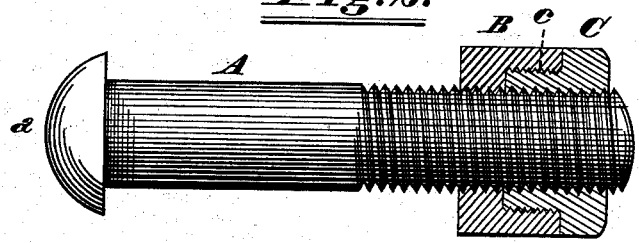
Attest
Inventor
William S. F. Dillon

UNITED STATES PATENT OFFICE.

WILLIAM S. F. DILLON, OF MADEIRA, OHIO.

NUT-LOCK.

SPECIFICATION forming part of Letters Patent No. 257,854, dated May 16, 1882.

Application filed April 13, 1881. (No model.)

*To all whom it may concern:*

Be it known that I, WILLIAM STENNELL FORDYCE DILLON, of Madeira, in the county of Hamilton and State of Ohio, have invented certain new and useful Improvements in Lock-Nuts, of which the following is a specification.

My invention relates to a lock-nut. It consists in making the top or nut of two parts, a main nut and a secondary nut screwing into the main nut by a series of independent male and female threads, which are finer, preferably, than the threads which pass through the nuts, and which correspond with those on the bolt. The interior or female threads of the main nut are continued through the locking-nut, when the latter is screwed up to the setting-point. A slight backward turn of the lock-nut effectually locks or sets the main nut in any desired position, making it necessary to turn the locking-nut forward before the main nut can be unscrewed.

In the accompanying drawings, Figure 1 is a longitudinal elevation of my improvement. Fig. 2 is another view, showing the nuts in cross-section.

A represents an ordinary bolt; a, the head of the bolt; B, a nut with a set of secondary female screw-threads fitting the male or bolt thread.

C represents the locking-nut, the interior of which has female screw-threads of the same pitch as those of the inner thread of the nut B, which together form a continuous thread when the nut C is screwed up jam against the nut B. Nut C has two diameters. Upon the periphery of the smaller diameter are cut male threads, preferably finer than the female inner threads of B and C. The male threads on nut C fit the inner female threads of nut B, as shown in Fig. 2.

It is obvious that nut B could be made with a series of male threads upon the exterior periphery, and the lock-nut C could be made of large diameter and have female threads to fit the male threads on nut B; but the plan here shown I deem the best.

By having the lock-nut C with threads for combining it with nut B of a lesser pitch than both threads there is an increase of leverage, requiring less power to lock or set the nut.

The locking is effected by holding the nut B rigidly and turning the nut C backward or to the left. To unscrew the nuts when locked upon the bolt it is necessary to turn nut C forward, when both nuts can be unscrewed together.

This improvement is very simple and much more effective and convenient than any device for a similar purpose hitherto used.

I claim—

The combination, substantially as specified, of bolt A with the nut composed of two parts, B and C, secured by screw-thread connection, as shown, the screw connecting the two parts of the nut being of a different pitch from the screw upon the bolt.

In testimony whereof I have hereunto set my hand and seal in the presence of two subscribing witnesses.

WM. S. F. DILLON. [L. S.]

Witnesses:
JOHN M. BONHAM,
FLAMEN BALL, Jr.